United States Patent
Wittenberg et al.

(10) Patent No.: US 12,361,241 B2
(45) Date of Patent: Jul. 15, 2025

(54) SCAN ENGINE RANGING FAILURE HANDLING

(71) Applicant: ZEBRA TECHNOLOGIES CORPORATION, Lincolnshire, IL (US)

(72) Inventors: Carl D. Wittenberg, Water Mill, NY (US); Maulin Sheth, Central Islip, NY (US)

(73) Assignee: Zebra Technologies Corporation, Lincolnshire, IL (US)

( * ) Notice: Subject to any disclaimer, the term of this patent is extended or adjusted under 35 U.S.C. 154(b) by 0 days.

(21) Appl. No.: 18/137,224

(22) Filed: Apr. 20, 2023

(65) Prior Publication Data

US 2024/0354527 A1    Oct. 24, 2024

(51) Int. Cl.
*G06K 7/10* (2006.01)
*G01B 11/02* (2006.01)

(52) U.S. Cl.
CPC ........ *G06K 7/10811* (2013.01); *G01B 11/026* (2013.01); *G06K 7/10732* (2013.01)

(58) Field of Classification Search
CPC ........... G06K 7/10811; G06K 7/10732; G01B 11/026
USPC ....................................... 235/462.01–462.49
See application file for complete search history.

(56) References Cited

U.S. PATENT DOCUMENTS

| | | | |
|---|---|---|---|
| 11,606,517 B1 | 3/2023 | Sharma et al. | |
| 2005/0152229 A1 | 7/2005 | Ito et al. | |
| 2006/0022052 A1* | 2/2006 | Patel | G06K 7/10722 |
| | | | 235/462.26 |
| 2006/0038017 A1* | 2/2006 | Carlson | G02B 7/08 |
| | | | 235/462.24 |
| 2008/0105748 A1 | 5/2008 | Lei | |
| 2008/0296383 A1* | 12/2008 | Gurevich | G06K 7/10732 |
| | | | 235/462.21 |
| 2022/0100979 A1 | 3/2022 | Fernandez-Dorado et al. | |
| 2022/0198169 A1 | 6/2022 | Van Horn et al. | |

OTHER PUBLICATIONS

International Search Report and Written Opinion for International Patent Application No. PCT/US2024/25339 mailed on Aug. 7, 2024.

* cited by examiner

*Primary Examiner* — Daniel A Hess
(74) *Attorney, Agent, or Firm* — Yuri Astvatsaturov

(57) ABSTRACT

The disclosure is an imaging system for use in a variable focus indicia reader having a controller configured to activate and deactivate a light source, an imaging assembly configured to capture imaging data of an environment appearing within a field of view of the imaging assembly, and a focus module configured to set a focus characteristic of the imaging assembly. The focus module may set the focus characteristic based on (i) an image processor successfully determining a distance to a target or (ii) ambient lighting conditions exceeding a predetermined threshold.

17 Claims, 5 Drawing Sheets

SCAN ENGINE RANGING FAILURE HANDLING

BACKGROUND

Imaging systems are used in many applications, and thus require an adjustable focus assembly to image indicia, or targets, at various distances. In some situations, the imaging system may not effectively acquire ranging data. Without the requisite ranging data, the imaging system can experience a ranging failure, leading to the inability to set a defined focal range of the adjustable focus assembly. Therefore, there is a need for systems, devices, and methods, which will reactively set the appropriate focus parameter in response to the imaging system experiencing a ranging failure.

SUMMARY

In an embodiment, the present invention is an imaging system for use in a variable focus indicia reader, comprising: a light source configured to direct an aiming light pattern to a target, the light source directed along a first axis, and a controller configured to activate and deactivate the light source. The imaging system further comprises an imaging assembly configured to capture imaging data of an environment appearing within a field of view of the imaging assembly, wherein imaging data comprises a first image of the target along a second axis and a second image of the target along the second axis, wherein the light source is deactivated during the capture of the first image and the light source is activated during the capture of the second image; and a focus module configured to set a focus characteristic of the imaging assembly based on one of (i) an image processor successfully determining a distance to the target based on a determined position of the aiming light pattern within the field of view of the imaging assembly from the first image and the second image or (ii) ambient lighting conditions exceeding a predetermined threshold, wherein the image processor determines ambient lighting conditions from at least one of the first image, the second image, or a third image captured subsequent to the first image and second image.

In another embodiment, the present invention is a method of determining a distance to a target to be read by an imaging system, comprising: activating a light source configured to direct an aiming light pattern to a target, the light source directed along a first axis; capturing a first image of the target along a second axis; deactivating the light source; capturing a second image of the target along the second axis; and setting a focus characteristic of an imaging assembly based on one of (i) an image processor successfully determining a distance to the target based on a determined position of the aiming light pattern within a field of view of the imaging assembly from the first image and the second image or (ii) ambient lighting conditions exceeding a predetermined threshold, wherein the image processor determines ambient lighting conditions from at least one of the first image, the second image, or a third image captured subsequent to the first image and second image.

In yet another embodiment, the present invention is a non-transitory computer readable storage medium storing one or more computer programs adapted to cause a processor based system to execute steps comprising: activating a light source configured to direct an aiming light pattern to a target, the light source directed along a first axis; capturing a first image of the target along a second axis; deactivating the light source; capturing a second image of the target along the second axis; and setting a focus characteristic of an imaging assembly based on one of (i) an image processor successfully determining a distance to the target based on a determined position of the aiming light pattern within a field of view of the imaging assembly from the first image and the second image or (ii) ambient lighting conditions exceeding a predetermined threshold, wherein the image processor determines ambient lighting conditions from at least one of the first image, the second image, or a third image captured subsequent to the first image and second image.

BRIEF DESCRIPTION OF THE SEVERAL VIEWS OF THE DRAWINGS

The accompanying figures, where like reference numerals refer to identical or functionally similar elements throughout the separate views, together with the detailed description below, are incorporated in and form part of the specification, and serve to further illustrate embodiments of concepts that include the claimed invention, and explain various principles and advantages of those embodiments.

Figure 1:
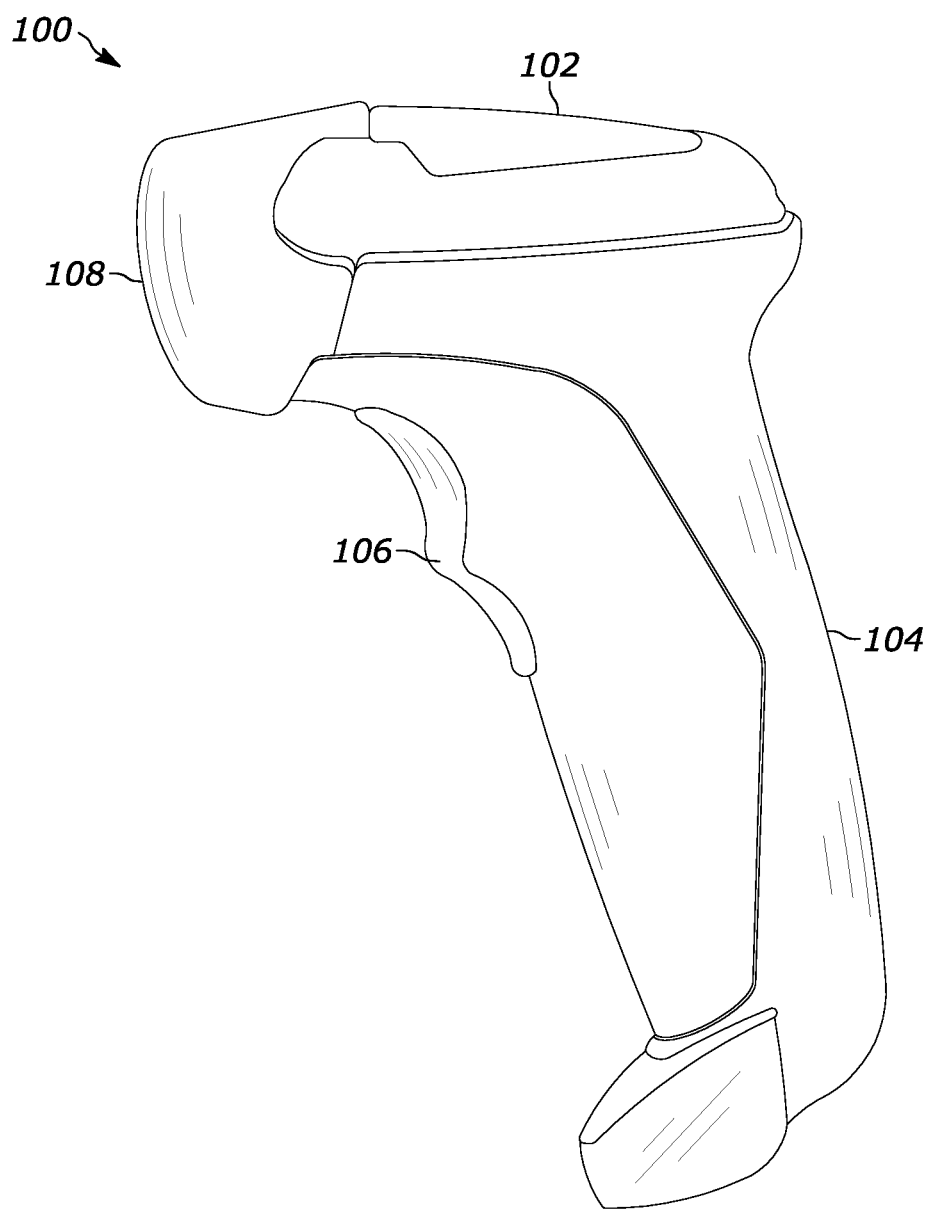
FIG. 1 is a side view of an example imaging system of the present disclosure.

Skilled artisans will appreciate that elements in the figures are illustrated for simplicity and clarity and have not necessarily been drawn to scale. For example, the dimensions of some of the elements in the figures may be exaggerated relative to other elements to help to improve understanding of embodiments of the present invention.

The apparatus and method components have been represented where appropriate by conventional symbols in the drawings, showing only those specific details that are pertinent to understanding the embodiments of the present invention so as not to obscure the disclosure with details that will be readily apparent to those of ordinary skill in the art having the benefit of the description herein.

DETAILED DESCRIPTION

An imaging system may be used in a variable focus indicia reader, which can be implemented as a platform indicia reader or a scan engine in a handheld imaging system. In an example, a handheld imaging system is used to scan a two-dimensional bar code. Generally, the scan engine is located in the housing of the handheld imaging system, which further includes a handle held by a user.

The imaging system includes an imaging assembly having an imager with an imaging array of photocells or light sensors, which correspond to image elements or pixels in an imaging field of view. The imaging system may further include an imaging lens assembly for capturing return light scattered and reflected from the target being imaged, and for projecting the return light onto the array to initiate capture of an image of the target. The imager may include a one-dimensional or two-dimensional charge coupled device ("CCD") or a complementary metal oxide semiconductor ("CMOS") device and associated circuits for producing and processing electronic signals corresponding to an array of pixel data over the imaging field of view.

To increase the amount of the return light captured by the array, for example, in a dimly lit environment, the imaging system may also include an illuminating light assembly for illuminating the target, preferably with a variable level of illumination light for reflection and scattering from the target. The illuminating light assembly may include an illumination light source and an illuminating lens. The imaging system may also include an aiming assembly for projecting an aiming light pattern onto a target with an aiming light source and an aiming lens.

In some applications, an imaging system must work at a range of distances, and thus, includes a focus module. In an example, the imaging system determines the distance, or range, to the target by determining the position of an aiming light pattern. Once the distance is determined, the imaging system may adjust the focus module. However, the imaging system is not able to determine the distance in all situations for a variety of reasons. Without the distance to the target, the imaging system would be unable to adjust the focus module.

In response, the imaging system may execute an automatic focusing sequence to manually determine the distance to the target. For example, the imaging system may start with far distances and progressively reduce the distance overtime until the distance is determined. However, this process may rely on capturing and processing many images over many successive frames over a relatively long time period of time to determine the appropriate focus distance. The process of capturing many images at specific times and distances corresponds to the focusing sequence of the imaging system. This increase of time caused by the focus sequence is undesirable in many applications. Accordingly, there is a need for systems, devices, and methods, which will reactively set the appropriate focus parameter in response to the imaging system experiencing a ranging failure.

The imaging system of the present disclosure includes an imaging system having a controller that can activate and deactivate a light source. In response to activation by the controller, the light source is configured to direct an aiming light pattern along an aiming axis, or first axis, to a target. The imaging system may further include an assembly, or imaging assembly, for capturing imaging data of an environment appearing within a field of view of the imaging assembly. In an example, the imaging data includes a first image of the target along an imaging axis, or second axis, and a second image of the target along the imaging axis. Before capturing the first image, the controller activates the light source to direct the aiming light pattern along the aiming axis onto the target. Thus, the first image contains the aiming light pattern with the light source activated. Before capturing the second image, the controller deactivates the light source.

The first image and the second image are captured in a frame over a field of view having the imaging axis offset from the aiming axis. And once captured, the first image and the second image are used to obtain first image data and second image data, which correspond to average brightness values for determining the position of the aiming light pattern. Namely, an image processor uses a comparison between the first image data and the second image data over a common fractional region of both frames to determine the position of the aiming light pattern in the first image. The position of the aiming light pattern in the first image is then used to determine the distance to the target.

In an example, the imaging system captures the first image of the target. Then, the image processor executes a first determination of the position of the aiming light pattern by dividing the first image into four rows and four columns, creating sixteen sub-regions. Once divided, the image processor determines the average brightness value of each of the sixteen sub-regions, generating sixteen average brightness values. The sixteen average brightness values are used to generate a first array. In this example, the first array is an array of four columns and four rows with sixteen average brightness values that correspond to the sixteen sub-regions of the first image.

Using similar steps, after the controller deactivates the light source, the image processor generates a second array corresponding to average brightness values of each sub-region of the second image. Then, the first array and the second array are used to calculate a change in average brightness values between the first image and the second image to determine the position of the aiming light pattern. Once complete, the focus module can set the focus characteristic based on the image processor successfully determining the distance to the target based on the determined position of the aiming light pattern.

However, a ranging failure may occur, preventing the imaging system from determining the distance to the target. In high ambient lighting conditions, the image processor may be unable to determine the position of the aiming light pattern. In an illustrative example, the imaging system generates the first array and the second array of average brightness values. In high ambient lighting conditions, image processor may fail to determine the position of the aiming light pattern. Although an imaging system may execute an automatic focusing sequence to manually determine the distance of the target, the focusing sequence may cause undesirable delays.

Further, unlike other ranging failures, a ranging failure caused by high ambient lighting conditions is likely to be repeated. For example, an operator that uses the imaging system outside, for example, may receive an imaging failure each time the imaging system is used. Without a change in the environment, the imaging system will continually fail, leading to a reliance on the automatic focusing process with the focusing sequence.

Thus, the imaging system of the present disclosure may instead set a focus characteristic based on the ambient lighting conditions exceeding a predetermined threshold. In an illustrative example, an operator activates the imaging system in an outdoor environment and a ranging failure occurs due to the high ambient lighting conditions. The imaging system may determine the high ambient light conditions from the first image, the second image, or a third image. Also, other methods that do not analyze a captured image can be used to determine high ambient light conditions. For example, the imaging system may include a photodiode as a separate component that determines ambient light conditions of the environment.

As introduced above, the focus module of the present disclosure may set a focus characteristic based on the ambient lighting conditions exceeding a predetermined threshold. In an example, the focus module may set the focus characteristic in response to the image processor failing to determine the distance to the target based on the determined position of the aiming light pattern. Further, the focus characteristic may be determined based on a focusing sequence.

The focusing sequence of the present disclosure may include a first sequence portion and a second sequence portion. In the first sequence portion of the focusing sequence, the imaging system focuses on a first predetermined distance. The first predetermined distance can vary depending on the specific application. For example, the first predetermined distance may be set at approximately 22 inches, which may increase the speed of the imaging system. In the second sequence portion, the imaging system progressively focuses at a number of distances while skipping, or excluding, the first predetermined distance. The second sequence portion may be also referred to as a near to far focusing sweep.

FIG. 1 is a side view of the imaging system of the present disclosure. The imaging system 100 includes an upper portion 102 having a window 108 and a lower portion 104 having a trigger 106. The lower portion 104 may be titled away from the upper portion 102 at a desired angle of inclination at, for example, fifteen degrees. In an illustrative example, a user grips the lower portion 104 of the imaging system 100 as a handle. Then, a user may actuate the trigger 106 on the lower portion 104 by manually depressing the trigger 106. Once actuated, the trigger 106 may initiate the imaging system 100 to image a target, which can be, for example, a bar code. Imaging system of varying configurations could also be employed for handheld operations.

Figure 2:
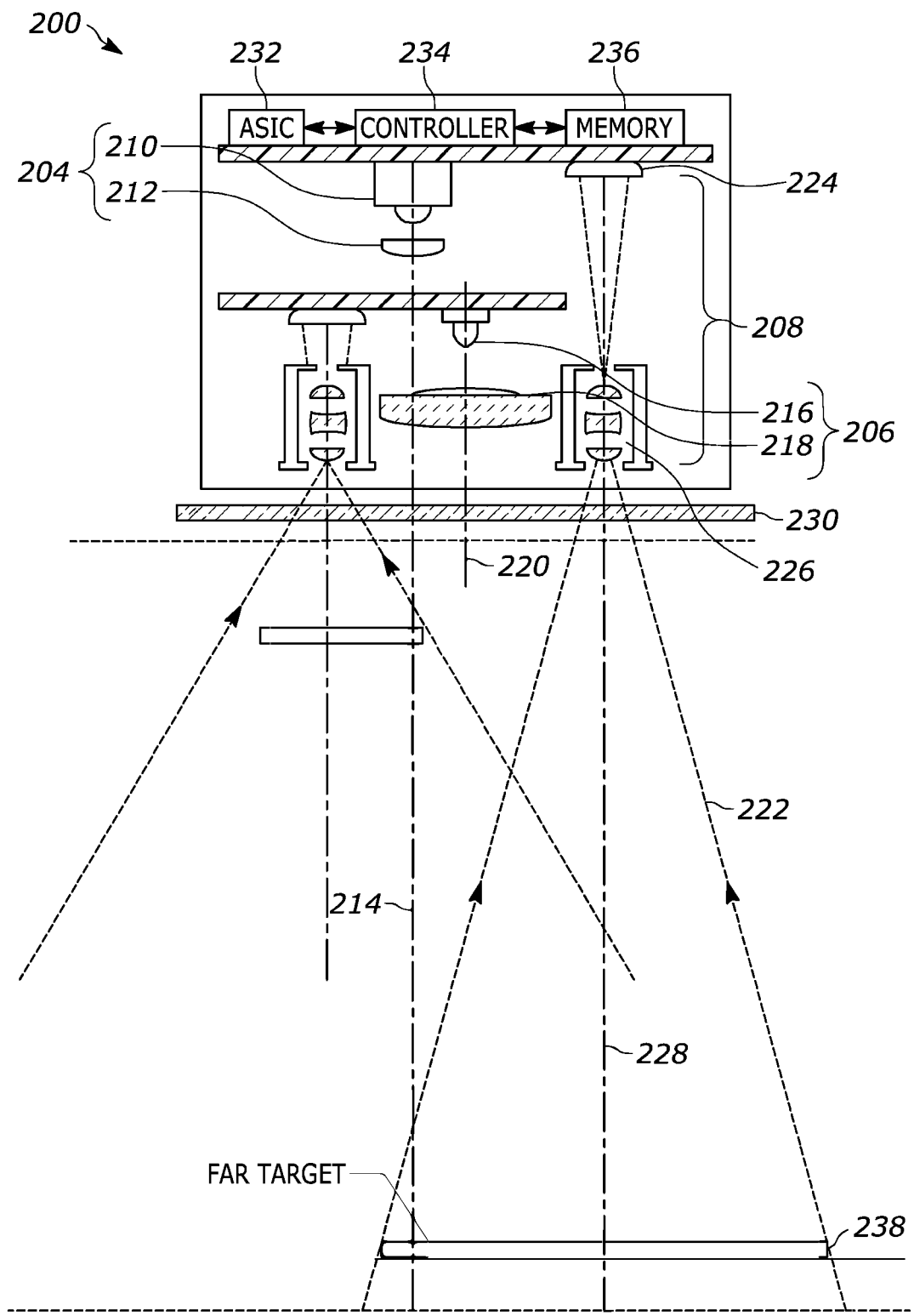
FIG. 2 is a diagram of an example imaging system of the present disclosure.

FIG. 2 is a diagram of an example imaging system of the present disclosure. The imaging system 200 is configured to read targets by capturing images through the window 230 over a range of working distances. As used throughout the detailed description, a working distance is defined by the distance between the window 230 and the target. The working distances of the imaging system 200 may include near distances and far distances. Near distances may include a few inches while far distances may include several feet.

The imaging system 200 includes an aiming assembly 204, an illumination assembly 206, and an imaging assembly 208. The aiming assembly 204 includes a light source 210 and an aiming lens 212. The aiming assembly 204 and the aiming lens 212 are mounted on an aiming axis 214. In an example embodiment, the aiming lens 212 is a diffractive or a refractive optical element. The aiming lens 212 projects the light source 210 onto a target 238 as an aiming light pattern along the aiming axis 214. The aiming light pattern can be a laser or visible light.

The illumination assembly 206 includes an illumination light source 216 and an illumination lens 218. The illumination light source 216 and the illumination lens 218 are mounted on an optical axis 220. In an example, the illumination light source 216 is a light emitting diode ("LED"). The illumination assembly 206 is configured to emit illumination light at a variable illumination level from the imaging system.

The imaging assembly 208 captures return light over a field of view 222 and includes an imager 224 and a focus module 226. The imager 224 and the focus module 226 are mounted on an imaging axis 228. The focus module 226 is configured to focus the imaging assembly 208 on the target by setting a focusing characteristic. Example focus modules include motors, movable lenses, and liquid lenses. In some examples, the focus module 226 is controlled by the imaging system 200.

The imager 224 is a solid-state device. In an example, the imager 224 is a CD or a CMOS imager having a one-dimensional array of addressable image sensors or pixels arranged in a single, linear row. The imager 224 may also include a CD or a CMOS imager having a two-dimensional array of addressable image sensors or pixels arranged in mutually orthogonal rows and columns, operative for detecting return light captured by the imaging assembly 208.

The imaging system 200 may further include an image processor 232 and a controller 234 connected to a memory 236. The controller 234 is operatively connected to the imager 224, the illumination light source 216 of the illumination assembly 206, and the light source 210 of the aiming assembly 204, such that the controller 234 can control the operation of the imager 224, the illumination light source 216 of the illumination assembly 206, and the light source 210 of the aiming assembly 204. In an example embodiment, the controller 234 also processes the return light from the target 238 and decodes the captured target images. The image processor 232 is operatively connected between the imager 224 and the controller 234 for processing the images captured by the imager 224.

Further, the image processor 232 is used to analyze the images captured by the imager 224 in order to determine the position of the aiming light pattern. To minimize cost, the image processor 232 is preferably incorporated in a low power, low processing device, preferably without a frame buffer to store images. As a result, the image processor 232 is not tasked with analyzing each entire captured image, but instead, only analyzes a portion of each captured image, especially the portion of the image in which the aiming light pattern is expected to appear along a trajectory. The image processor 232 may be an application specific integrated circuit ("ASIC") or a field-programmable gate array ("FPGA"). The image processor 232 may also be integrated with the controller 234.

The aiming axis 214 is offset from optical axis 220, resulting in a parallax between an aiming light pattern on the aiming axis 214 and the optical axis 220 for providing target distance information. Namely, the parallax between the aiming axis 214 and the optical axis 220 provides range information from the pixel position of the aiming light pattern on one of the imaging sensor arrays.

Figure 3:
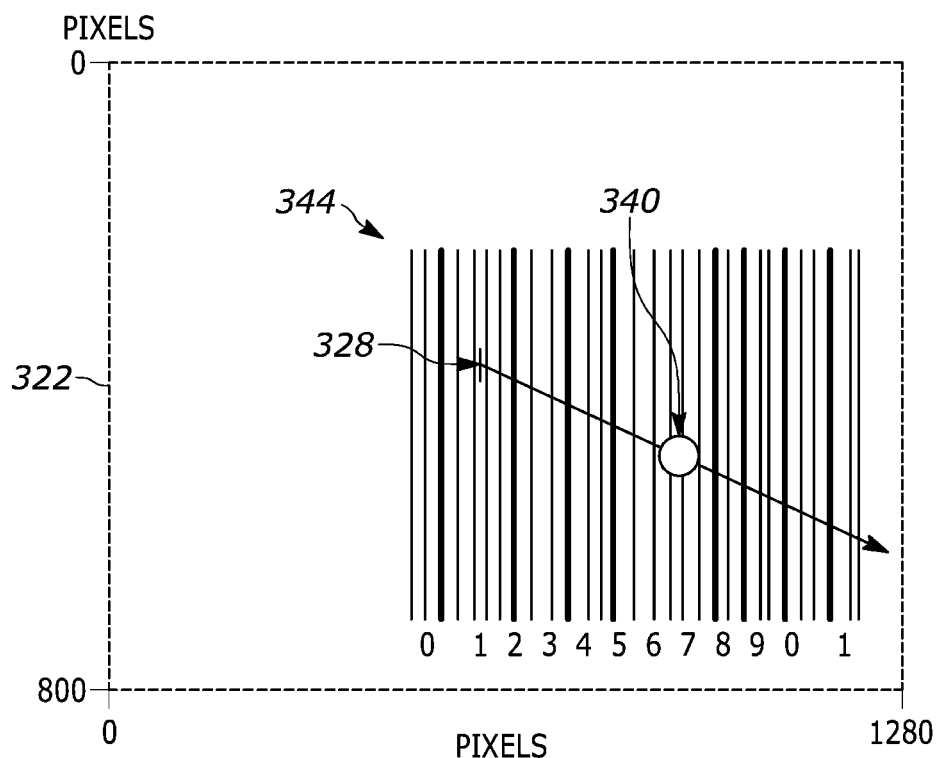
FIG. 3 is a view of an example aiming light pattern of the imaging system of the present disclosure.

FIG. 3 is a view of an aiming light pattern of the imaging system of the present disclosure. FIG. 3 illustrates a target configured as a symbol 344 in a field of view 322 with the imaging axis 328. By determining the position of the aiming light pattern 340 relative to the portion of the captured frame, the working distance of the symbol 344 can be determined. In an example embodiment, the spacing between the aiming light pattern 340 and the imaging axis 328 is proportional to the reciprocal of the working distance. Preferably, the position of the aiming light pattern 340 along a trajectory is calibrated in advance during imaging system manufacture. In an example, the symbol 344 is a two-dimensional resolution of 800 rows of pixels in height by 1280 columns of pixels in width. However, to leverage the relationship between the aiming light pattern 340 and the imaging axis 328, the imaging system must first determine the position of the aiming light pattern 338.

Figure 4:
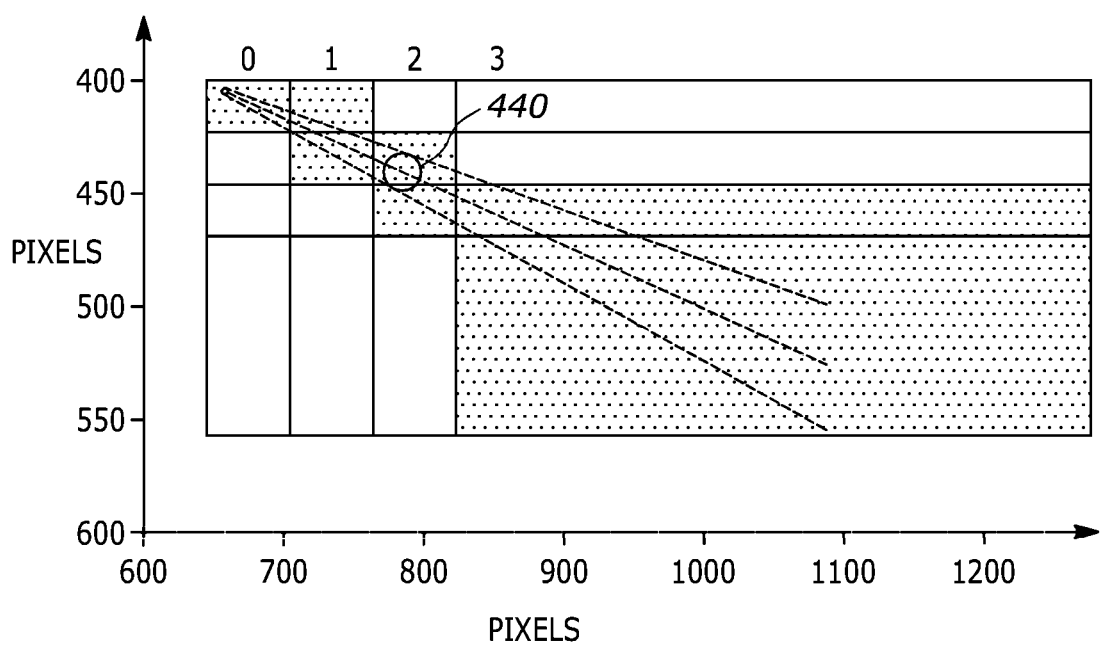
FIG. 4 is a view of an example aiming light pattern of the imaging system when the imaging system determines the position of the aiming light pattern of the present disclosure.

FIG. 4 is a view of an aiming light pattern of the imaging system when the imaging system determines the position of the aiming light pattern of the present disclosure. As previously introduced, the image processor 232 of FIG. 2 is used to analyze the captured images and determine the position of the aiming light pattern 440 relative to the captured frame. In an example, the image processor 232 uses average brightness values from an image of the target to determine the position of the aiming light pattern 440. However, the image processor 232 does not analyze portions of the image where the aiming light pattern 440 is not expected to be positioned. Thus, in FIG. 4, the image processor 232 does not analyze: (1) the pixels in row 0 to about row 400; (2) the pixels in about row 560 to row 800; or (3) the pixels in column 0 to about column 640. The image processor 232 may conserve processing power and time by only analyzing pixels where the aiming light pattern 440 will be present. The fractional region or remaining area contains only about 160 rows of the original 800 rows of the full first image, and can thus be captured and analyzed much faster than the full first image.

Figure 5:
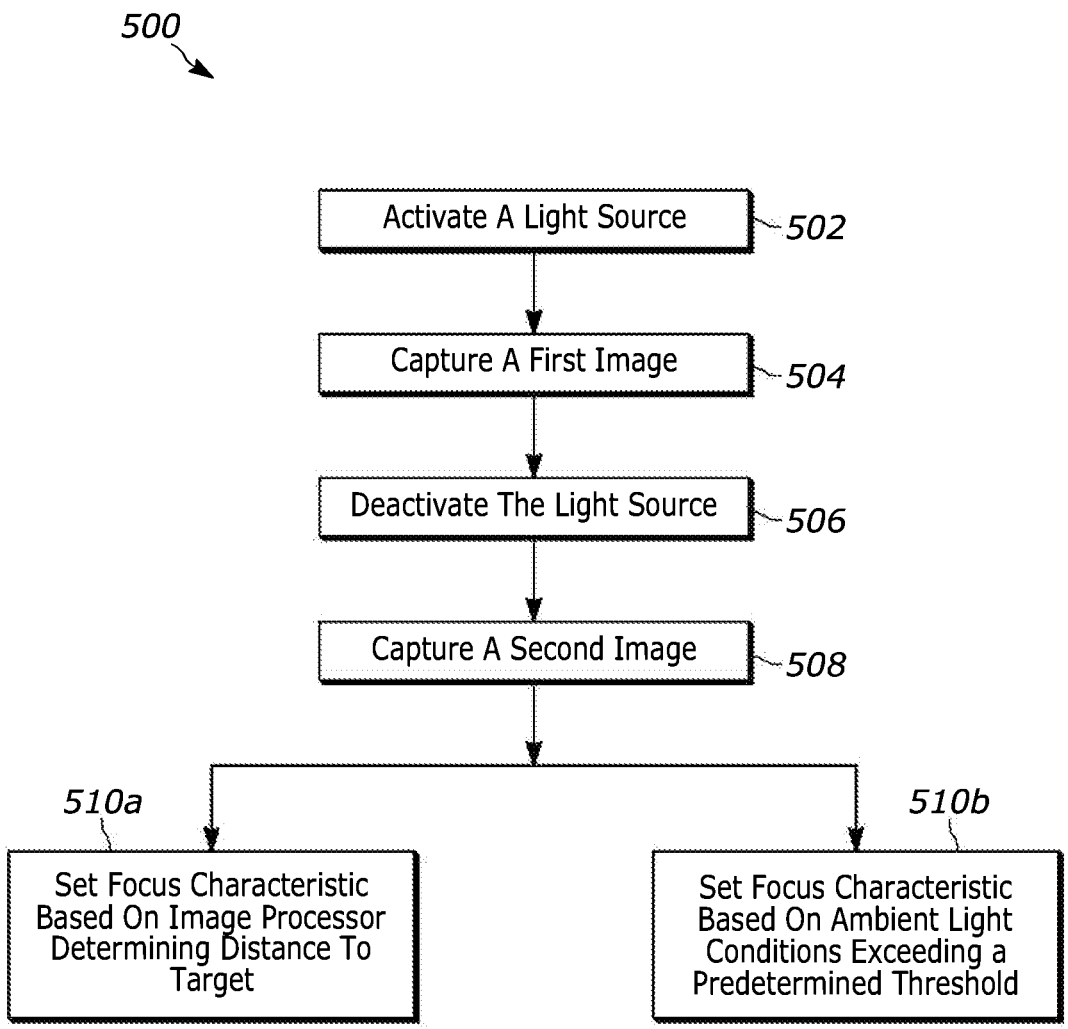
FIG. 5 is an example flow chart illustrating blocks for determining the target distance in accordance with the present disclosure.

FIG. 5 is a flow chart illustrating an example process 500 of determining a distance to a target to be read by an imaging system in accordance with the present disclosure. As introduced above, a user may actuate the imaging system by depressing the trigger, activating a light source configured to direct an aiming light pattern to a target along a second axis (block 502). Once the light source is activated, the imaging assembly captures a first image of the target along a second axis (block 504). The imaging system deactivates the light source (block 506) and captures a second image of the target along the second axis (block 508). Then, the focus module may set a focus characteristic of an imaging assembly based on an image processor successfully determining a distance to the target (block 510*a*). The image processor may determine a distance to the target based on a determined position of the aiming light pattern within the field of view of the imaging assembly from the first image and the second image.

However, in some instances, the image processor may be unable to determine the position of the aiming light pattern, and thus, be unable to determine a distance for adjusting the focusing element. Thus, the focus module may set the focus characteristic of the imaging assembly based on ambient lighting conditions exceeding a predetermined threshold (block 510*b*). The image processor may determine ambient lighting conditions from at least one of the first image, the second image, or a third image. In an example, the third image is any image captured subsequent to the first image or the second image. In another example, the image processor uses a predetermined threshold of 2000 lux.

Figure 6:
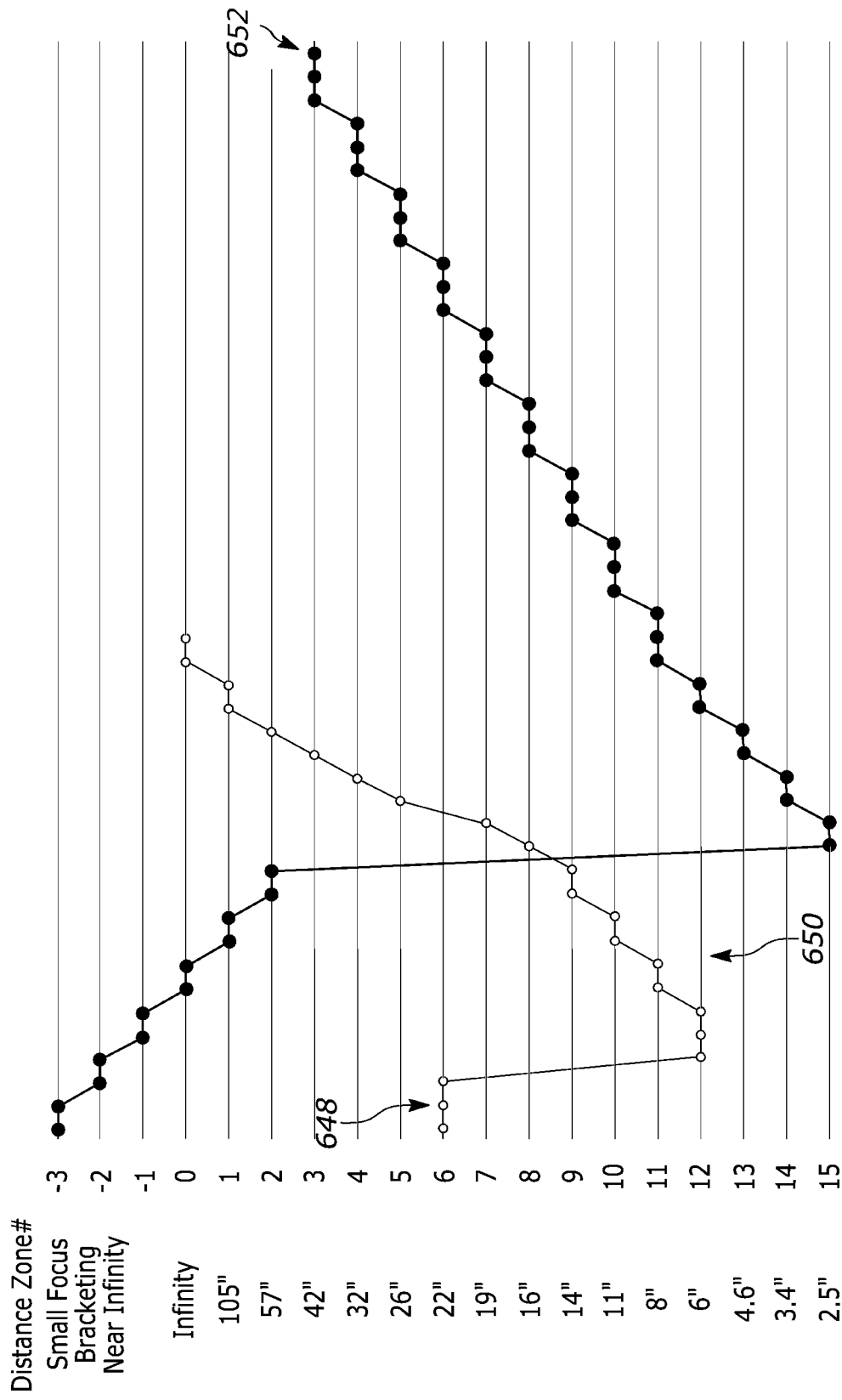
FIG. 6 is an example embodiment of the focusing sequence of the present disclosure.

In an example, the focus characteristic is determined based on the image processor executing a focusing sequence. FIG. 6 is an example embodiment of the focusing sequence of the present disclosure. The focusing sequence is illustrated on a time versus distance graph. The focusing sequence initially uses a first sequence portion 648. In the example focusing sequence of FIG. 6, the first sequence portion 648 is approximately 22 inches. However, the first sequence portion 648 can be adjusted depending on the type of application. This example can reflect, for example, the application of scanning barcodes on items where 22 inches is a common working distance. If the imaging system does not determine the correct focusing distance based on the first sequence portion 648, a second sequence portion 650 of progressively increasing distances is triggered. Here, 6 inches is the first distance of the second sequence portion 650. The distance progressively increases but does not include the distance of the first sequence portion 648. As compared to a default focusing sequence 652, the focusing sequence of the disclosure is completed in fewer frames, leading to faster scanning times performed by the scanning engine.

In the foregoing specification, specific embodiments have been described. However, one of ordinary skill in the art appreciates that various modifications and changes can be made without departing from the scope of the invention as set forth in the claims below. Accordingly, the specification and figures are to be regarded in an illustrative rather than a restrictive sense, and all such modifications are intended to be included within the scope of present teachings.

The benefits, advantages, solutions to problems, and any element(s) that may cause any benefit, advantage, or solution to occur or become more pronounced are not to be construed as a critical, required, or essential features or elements of any or all the claims. The invention is defined solely by the appended claims including any amendments made during the pendency of this application and all equivalents of those claims as issued.

Moreover in this document, relational terms such as first and second, top and bottom, and the like may be used solely to distinguish one entity or action from another entity or action without necessarily requiring or implying any actual such relationship or order between such entities or actions. The terms "comprises," "comprising," "has", "having," "includes", "including," "contains", "containing" or any other variation thereof, are intended to cover a non-exclusive inclusion, such that a process, method, article, or apparatus that comprises, has, includes, contains a list of elements does not include only those elements but may include other elements not expressly listed or inherent to such process, method, article, or apparatus. An element proceeded by "comprises . . . a", "has . . . a", "includes . . . a", "contains . . . a" does not, without more constraints, preclude the existence of additional identical elements in the process, method, article, or apparatus that comprises, has, includes, contains the element. The terms "a" and "an" are defined as one or more unless explicitly stated otherwise herein. The terms "substantially", "essentially", "approximately", "about" or any other version thereof, are defined as being close to as understood by one of ordinary skill in the art, and in one non-limiting embodiment the term is defined to be within 10%, in another embodiment within 5%, in another embodiment within 1% and in another embodiment within 0.5%. The term "coupled" as used herein is defined as connected, although not necessarily directly and not necessarily mechanically. A device or structure that is "configured" in a certain way is configured in at least that way, but may also be configured in ways that are not listed.

The Abstract of the Disclosure is provided to allow the reader to quickly ascertain the nature of the technical disclosure. It is submitted with the understanding that it will not be used to interpret or limit the scope or meaning of the claims. In addition, in the foregoing Detailed Description, it can be seen that various features are grouped together in various embodiments for the purpose of streamlining the disclosure. This method of disclosure is not to be interpreted as reflecting an intention that the claimed embodiments require more features than are expressly recited in each claim. Rather, as the following claims reflect, inventive subject matter lies in less than all features of a single disclosed embodiment. Thus the following claims are hereby incorporated into the Detailed Description, with each claim standing on its own as a separately claimed subject matter.

The invention claimed is:

1. An imaging system for use in a variable focus indicia reader, comprising:
   a light source configured to direct an aiming light pattern to a target, the light source directed along a first axis;
   a controller configured to activate and deactivate the light source;
   an imaging assembly configured to capture imaging data of an environment appearing within a field of view of the imaging assembly, wherein imaging data comprises a first image of the target along a second axis and a second image of the target along the second axis, wherein the light source is deactivated during the capture of the first image and the light source is activated during the capture of the second image; and a focus module configured to set a focus characteristic of the imaging assembly based on one of (i) an image processor successfully determining a distance to the target based on a determined position of the aiming light pattern within the field of view of the imaging assembly from the first image and the second image or (ii) ambient lighting conditions exceeding a predetermined threshold, wherein the image processor determines ambient lighting conditions from at least one of the first image, the second image, or a third image captured subsequent to the first image and second image, wherein the focus module is further configured to set the focus characteristic of the imaging assembly based on ambient lighting conditions exceeding the predetermined threshold responsive to the image processor failing to determine the distance to the target based on the determined position of the aiming light pattern within the field of view of the imaging assembly from the first image and the second image.

2. The imaging system of claim 1, wherein the focus characteristic is determined based on the image processor executing a focusing sequence, wherein the focusing sequence comprises:
a first sequence portion focusing on a first predetermined distance; and
a second sequence portion progressively focusing on a plurality of predetermined distances including one or more distances closer than the first predetermined distance and one or more distances farther than the first predetermined distance, wherein the plurality of predetermined distances excludes the first predetermined distance.

3. The imaging system of claim 2, wherein the second sequence portion focuses on one or more distances closer than the first predetermined distance before focusing on one or more distances farther than the first predetermined distance.

4. The imaging system of claim 1, wherein the aiming light pattern is visible light.

5. The imaging system of claim 1, wherein the aiming light pattern is a laser.

6. The imaging system of claim 1, wherein the predetermined threshold exceeds approximately 2000 lx.

7. A method of determining a distance to a target to be read by an imaging system, comprising:
activating a light source configured to direct an aiming light pattern to a target, the light source directed along a first axis;
capturing a first image of the target along a second axis;
deactivating the light source;
capturing a second image of the target along the second axis; and
setting a focus characteristic of an imaging assembly based on one of (i) an image processor successfully determining a distance to the target based on a determined position of the aiming light pattern within a field of view of the imaging assembly from the first image and the second image or (ii) ambient lighting conditions exceeding a predetermined threshold, wherein the image processor determines ambient lighting conditions from at least one of the first image, the second image, or a third image captured subsequent to the first image and second image, wherein a focus module is configured to set the focus characteristic of the imaging assembly based on ambient lighting conditions exceeding the predetermined threshold responsive to the image processor failing to determine the distance to the target based on the determined position of the aiming light pattern within the field of view of the imaging assembly from the first image and the second image.

8. The method of claim 7, wherein the focus characteristic is determined based on the image processor executing a focusing sequence, wherein the focusing sequence comprises:
a first sequence portion focusing on a first predetermined distance; and
a second sequence portion progressively focusing on a plurality of predetermined distances including one or more distances closer than the first predetermined distance and one or more distances farther than the first predetermined distance, wherein the plurality of predetermined distances excludes the first predetermined distance.

9. The method of claim 8, wherein the second sequence portion focuses on one or more distances closer than the first predetermined distance before focusing on one or more distances farther than the first predetermined distance.

10. The method of claim 9, wherein the first predetermined distance is approximately 22 inches.

11. The method of claim 7, wherein the aiming light pattern is visible light.

12. The method of claim 7, wherein the aiming light pattern is a laser.

13. The method of claim 7, wherein the predetermined threshold exceeds approximately 2000 lx.

14. A non-transitory computer readable storage medium storing one or more computer programs adapted to cause a processor based system to execute steps comprising:
activating a light source configured to direct an aiming light pattern to a target, the light source directed along a first axis;
capturing a first image of the target along a second axis;
deactivating the light source;
capturing a second image of the target along the second axis; and
setting a focus characteristic of an imaging assembly based on one of (i) an image processor successfully determining a distance to the target based on a determined position of the aiming light pattern within a field of view of the imaging assembly from the first image and the second image or (ii) ambient lighting conditions exceeding a predetermined threshold, wherein the image processor determines ambient lighting conditions from at least one of the first image, the second image, or a third image captured subsequent to the first image and second image, wherein a focus module is configured to set the focus characteristic of the imaging assembly based on ambient lighting conditions exceeding the predetermined threshold responsive to the image processor failing to determine the distance to the target based on the determined position of the aiming light pattern within the field of view of the imaging assembly from the first image and the second image.

15. The non-transitory computer readable storage medium of claim 14, wherein the focus characteristic is determined based on the image processor executing a focusing sequence, wherein the focusing sequence comprises:
- a first sequence portion focusing on a first predetermined distance; and
- a second sequence portion progressively focusing on a plurality of predetermined distances including one or more distances closer than the first predetermined distance and one or more distances farther than the first predetermined distance, wherein the plurality of predetermined distances excludes the first predetermined distance.

16. The non-transitory computer readable storage medium of claim 15, wherein the second sequence portion focuses on one or more distances closer than the first predetermined distance before focusing on one or more distances farther than the first predetermined distance.

17. The non-transitory computer readable storage medium of claim 16, wherein the first predetermined distance is approximately 22 inches.

\* \* \* \* \*